(12) United States Patent
Kubas (10) Patent No.: US 9,057,179 B1
(45) Date of Patent: Jun. 16, 2015

(54) TRACTOR LOADER ATTACHMENT SYSTEM

(71) Applicant: Bobby L. Kubas, Belfield, ND (US)

(72) Inventor: Bobby L. Kubas, Belfield, ND (US)

( * ) Notice: Subject to any disclaimer, the term of this patent is extended or adjusted under 35 U.S.C. 154(b) by 80 days.

(21) Appl. No.: 14/084,940

(22) Filed: Nov. 20, 2013

(51) Int. Cl.
| | |
|---|---|
| *E02F 3/627* | (2006.01) |
| *E02F 3/34* | (2006.01) |
| *E02F 3/36* | (2006.01) |
| *A01B 59/06* | (2006.01) |

(52) U.S. Cl.
CPC . *E02F 3/627* (2013.01); *E02F 3/34* (2013.01); *E02F 3/3695* (2013.01); *A01B 59/06* (2013.01)

(58) Field of Classification Search
CPC ................................. E02F 3/627; A01B 59/06
USPC ......................................................... 414/686
See application file for complete search history.

(56) References Cited

U.S. PATENT DOCUMENTS

| | | | | |
|---|---|---|---|---|
| 2,970,707 | A * | 2/1961 | Wagner et al. | 414/715 |
| 3,156,367 | A * | 11/1964 | Griffith | 414/715 |
| 3,255,903 | A * | 6/1966 | Lofgren et al. | 414/717 |
| 3,324,954 | A * | 6/1967 | Westendorf | 172/1 |
| 3,460,690 | A * | 8/1969 | Seifert | 414/697 |
| 3,554,396 | A * | 1/1971 | Demkiw | 414/697 |
| 3,920,138 | A * | 11/1975 | Frank | 414/815 |
| 4,065,009 | A * | 12/1977 | Old | 414/686 |
| 4,181,181 | A * | 1/1980 | Old | 172/443 |
| 4,554,978 | A * | 11/1985 | Schneider | 172/247 |
| 4,621,973 | A * | 11/1986 | Langenfeld et al. | 414/686 |
| 5,082,389 | A | 1/1992 | Balemi | |
| 6,102,131 | A * | 8/2000 | Malinowski | 172/273 |
| 6,375,405 | B1 | 4/2002 | Kallevig | |
| 6,773,223 | B2 | 8/2004 | Harris | |
| 6,994,511 | B2 * | 2/2006 | Westendorf et al. | 414/686 |
| 7,168,907 | B2 | 1/2007 | Lyons | |
| 7,458,526 | B2 * | 12/2008 | Honermann et al. | 239/172 |
| 7,648,305 | B2 | 1/2010 | Beales | |
| 8,177,454 | B2 | 5/2012 | Steig, Jr. | |
| 8,240,970 | B2 | 8/2012 | Bricker | |
| 8,281,506 | B2 | 10/2012 | Stefek | |

OTHER PUBLICATIONS http://www.messicks.com/NH/58252.aspx; 1998 Parts Manual for New Holland TV140—Install Loader to Tractor; Received and Printed on Sep. 23, 2013.

http://www.messicks.com/NH/58252.aspx; 1998 Parts Manual for New Holland TV140—Plates Locks for Loader; Received and Printed on Sep. 23, 2013.

* cited by examiner

*Primary Examiner* — Gerald McClain
(74) *Attorney, Agent, or Firm* — Neustel Law Offices (57) ABSTRACT

A tractor loader attachment system for efficiently attaching and removing a loader upon a tractor. The tractor loader attachment system generally includes a pivot bracket attached to a loader mounting pocket, an engaging member pivotally connected to the pivot bracket, an actuator attached to a first end of the engaging member and to the tractor frame, wherein movement of the actuator pivots the engaging member so that a hooked end of the engaging member engages or releases a shaft attached to the loader frame to selectively retain the loader frame attached to the tractor vehicle.

16 Claims, 11 Drawing Sheets

TRACTOR LOADER ATTACHMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tractor loaders and more specifically it relates to a tractor loader attachment system for efficiently attaching and removing a loader upon a tractor.

2. Description of the Related Art

Any discussion of the related art throughout the specification should in no way be considered as an admission that such related art is widely known or forms part of common general knowledge in the field.

Conventional loaders for tractors are attached to the tractor using bolt-type fasteners that secure a pair of mounting brackets on opposing sides of the frame of the tractor. One type of tractor is the NEW HOLLAND NH TV140 bi-directional tractor. To remove a loader, the user typically will get out of the cab of the tractor and remove the fasteners. This is a time consuming task since often times the fasteners are in tight areas that are difficult to access with tools. Furthermore, the operator of the tractor has to leave the comfort of the cab and be exposed to the current weather conditions such as heat, cold, rain or snow which is undesirable for extended periods of time.

Because of the inherent problems with the related art, there is a need for a new and improved tractor loader attachment system for efficiently attaching and removing a loader upon a tractor.

BRIEF SUMMARY OF THE INVENTION

The invention generally relates to a tractor loaders which includes a pivot bracket attached to a loader mounting pocket, an engaging member pivotally connected to the pivot bracket, an actuator attached to a first end of the engaging member and to the tractor frame, wherein movement of the actuator pivots the engaging member so that a hooked end of the engaging member engages or releases a shaft attached to the loader frame to selectively retain the loader frame attached to the tractor vehicle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 9 illustrate a tractor loader attachment system 10, which comprises a pivot bracket 70 attached to a loader mounting pocket 40, an engaging member 60 pivotally connected to the pivot bracket 70, an actuator 50 attached to a first end 62 of the engaging member 60 and to the tractor frame 14, wherein movement of the actuator 50 pivots the engaging member 60 so that a hooked end 66 of the engaging member 60 engages or releases a shaft attached to the loader frame 21 to selectively retain the loader frame 21 attached to the tractor vehicle 12. While the present invention described herein discusses mainly one set of attachments such as for a right side of the tractor vehicle 12, it can be appreciated that the present invention is comprised of two sets of attachments for both the right side and the left side of the tractor vehicle 12. For the purpose of simplicity, a majority of the discussion herein will focus upon the right side set as illustrated in the figures, but it can be appreciated that the left side set is also present and simply mirrors the left side set.

B. Tractor Vehicle.

Figure 1:
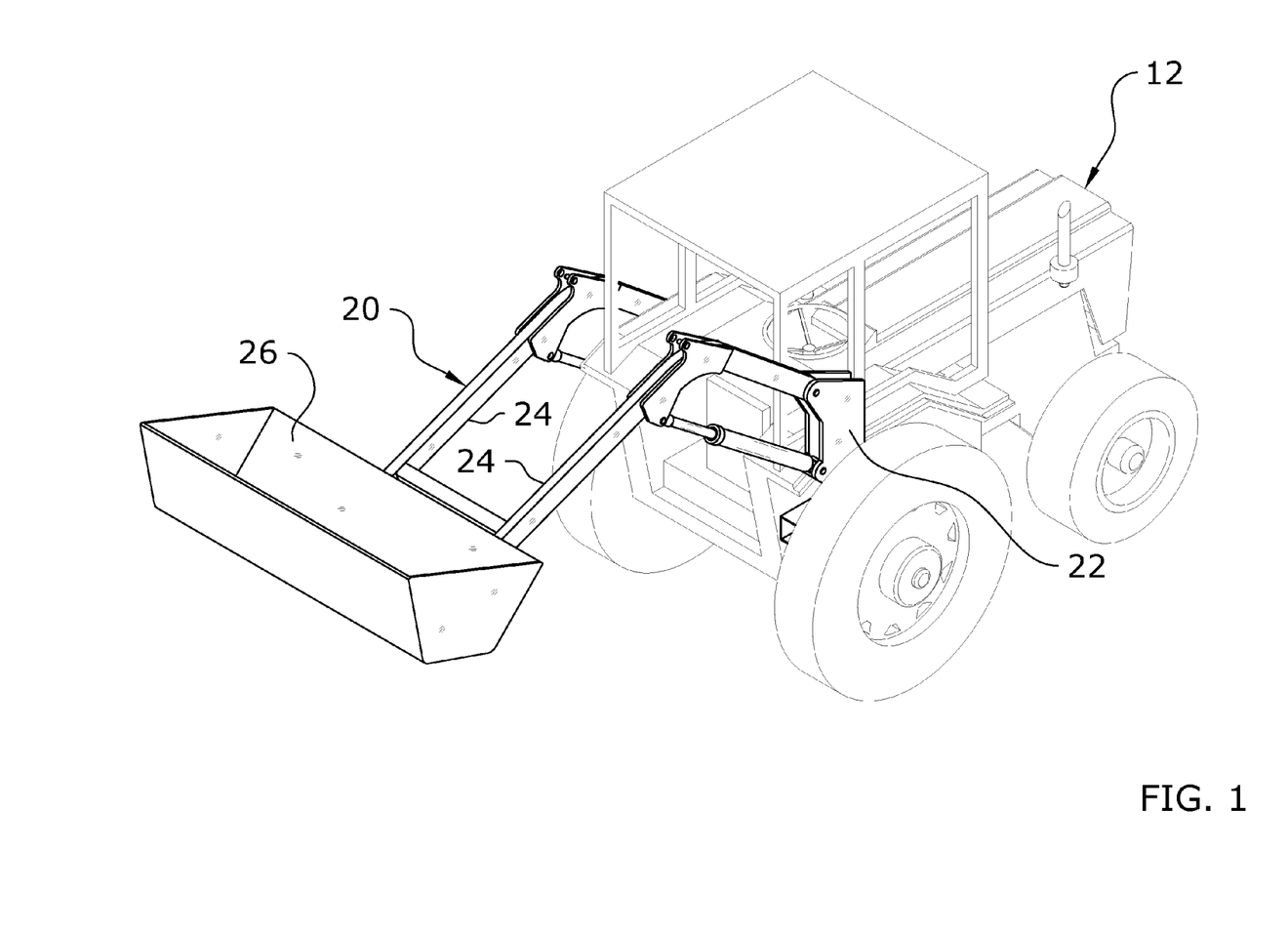
FIG. 1 is an upper perspective view of a loader unit attached to a tractor vehicle.
Figure 2:
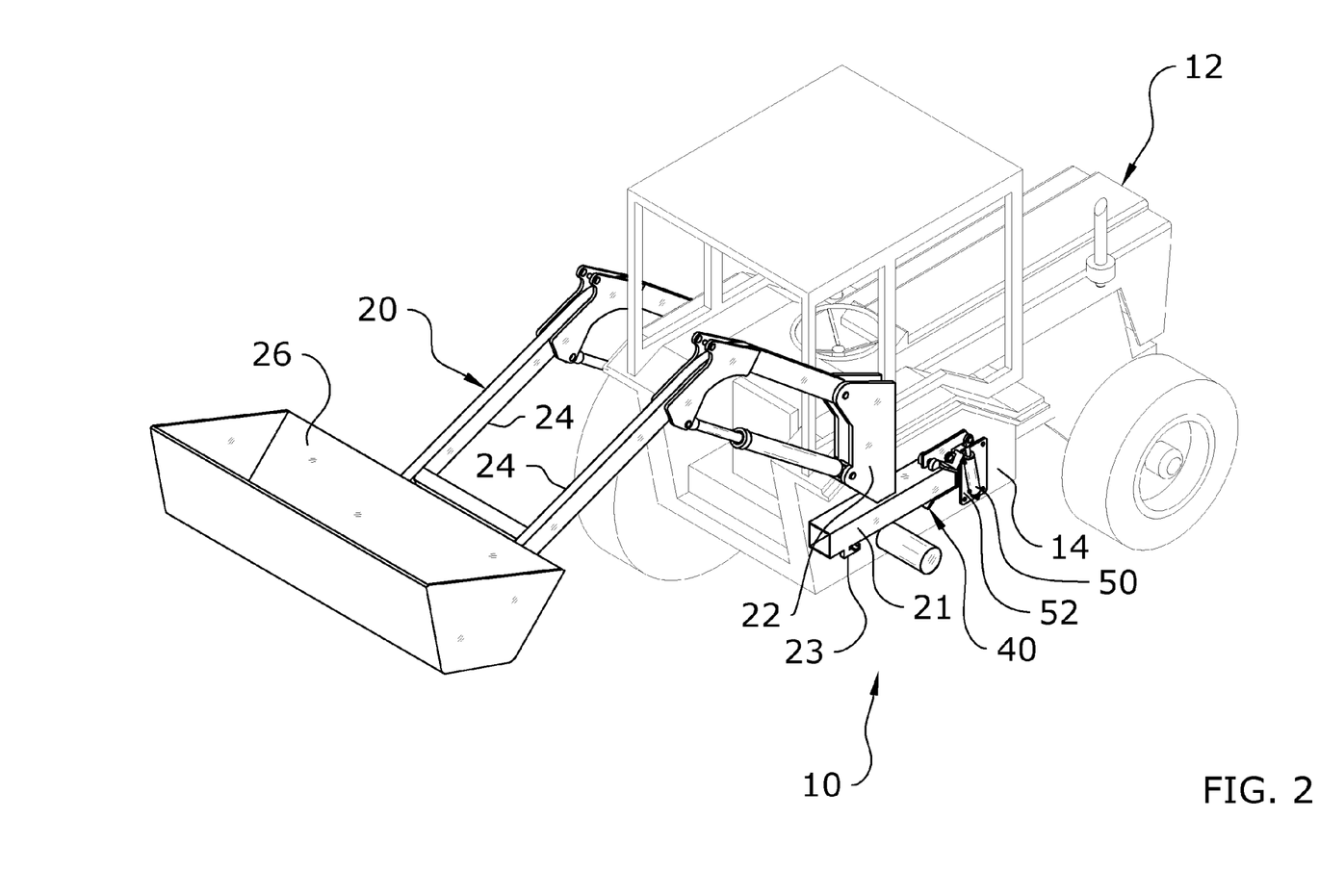
FIG. 2 is an upper perspective view of the loader unit attached to the tractor vehicle with a tire removed.
Figure 3:
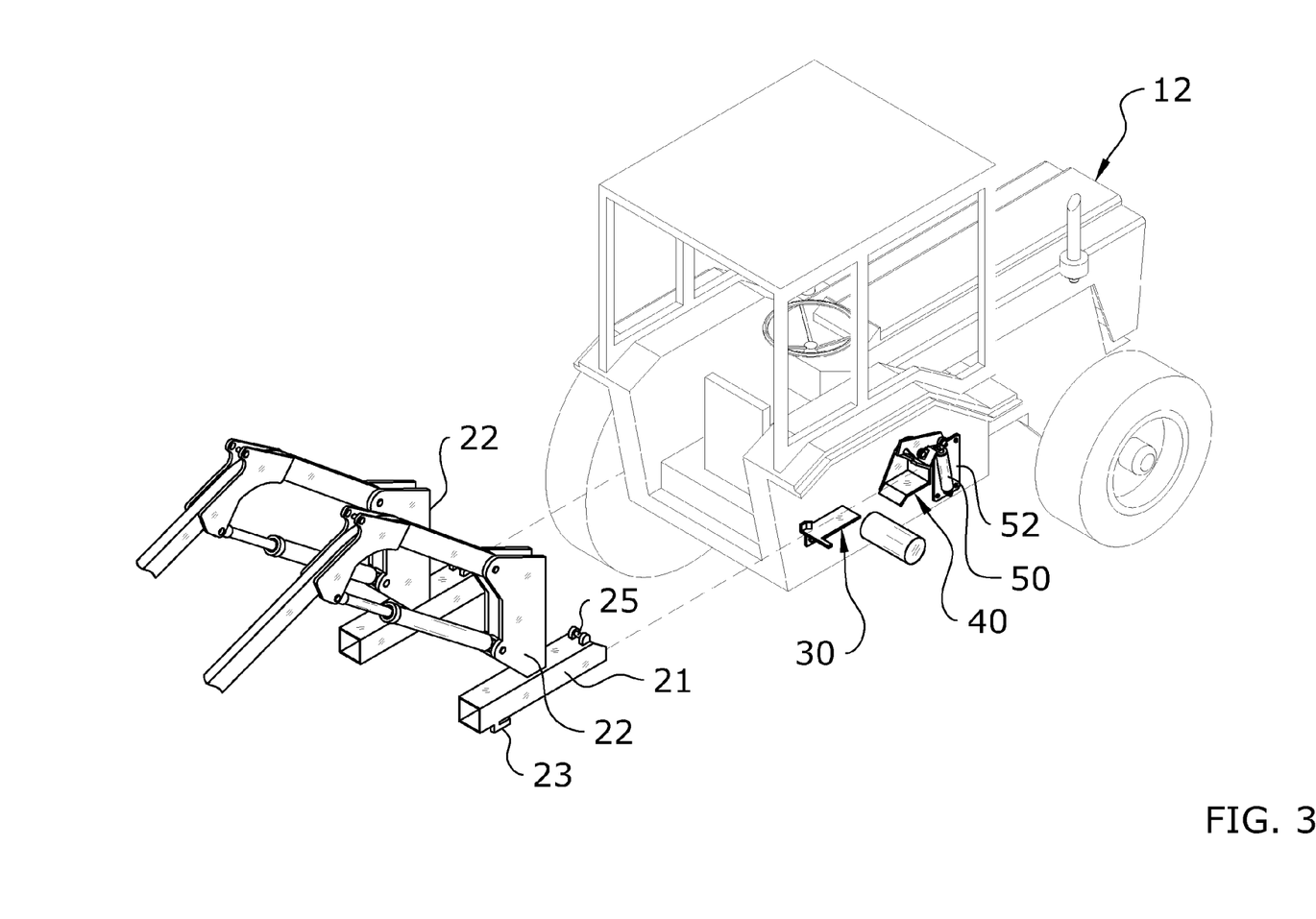
FIG. 3 is an upper perspective view of the loader unit removed from the tractor vehicle.
Figure 4:
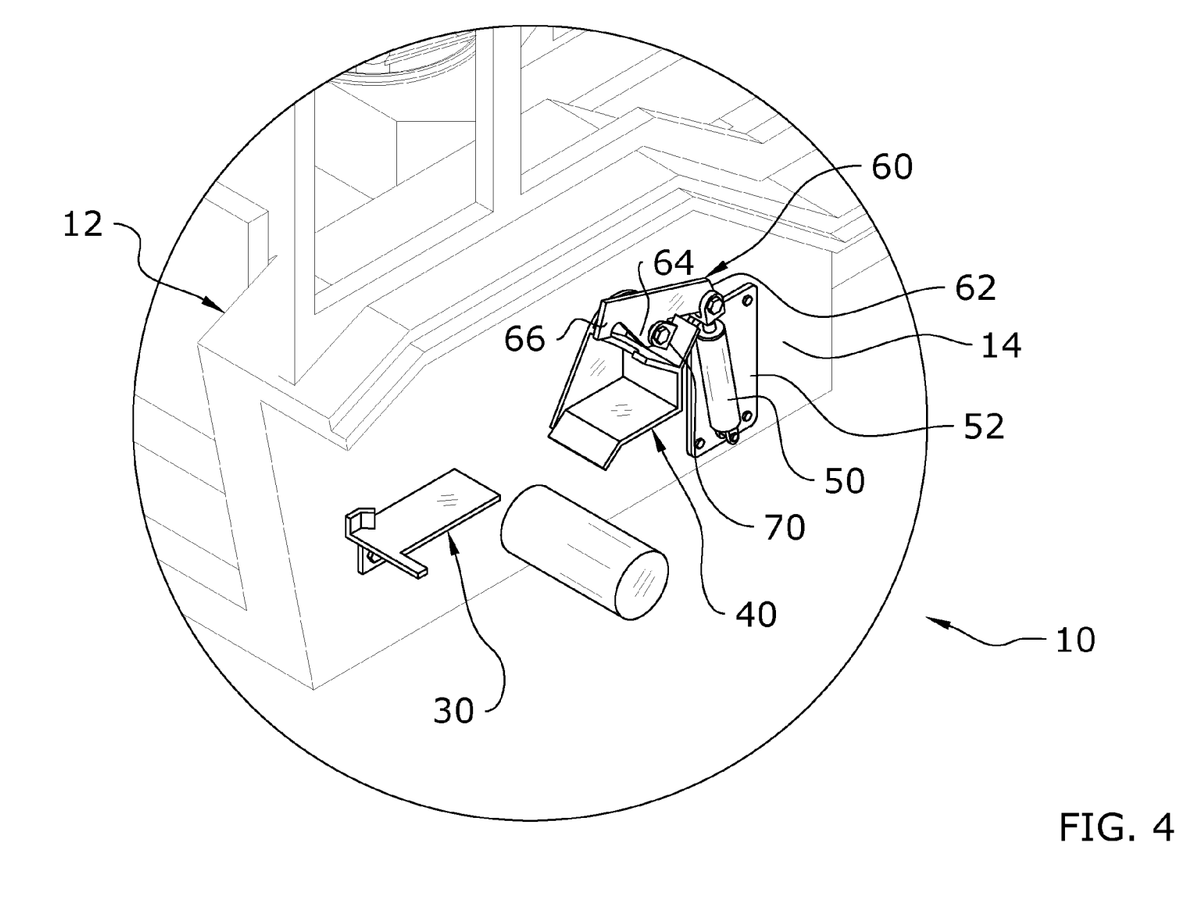
FIG. 4 is a is a magnified upper perspective view of the present invention attached to the tractor vehicle.

FIGS. 1 through 3 illustrate an exemplary tractor vehicle 12 having a tractor frame 14 with a plurality of wheels supporting the tractor frame 14. The tractor vehicle 12 may be comprised of a conventional tractor for agricultural use or other type of vehicle. Furthermore, the tractor vehicle 12 may be unidirectional or bidirectional. The present invention is particularly useful for a bidirectional tractor vehicle 12 because the mounting brackets for the loader unit 20 are typically attached to the portion of the tractor frame 14 near and hidden behind the larger rear wheels of the tractor vehicle 12 making the mounting brackets difficult to physically access by a user. As illustrated in FIGS. 1 through 3, the rear wheels of the tractor vehicle 12 are larger than the front wheels. The NEW HOLLAND NH TV140 bidirectional tractor is an exemplary tractor vehicle 12 the present invention is particularly useful for usage upon.

C. Loader Mounting Brackets and Loader Unit.

FIGS. 1 through 3 illustrate exemplary mounting brackets attached to the tractor frame 14 for removably attaching the loader unit 20 to. The present invention is attached to at least one of the conventional mounting brackets that are attached to the tractor frame 14 as illustrated in FIGS. 2 and 3 of the drawings. The mounting brackets may be comprised of two pairs of conventional mounting brackets with each pair attached to opposing sides of the tractor frame 14 such as a loader locking guide 30 and a loader mounting pocket 40 used with respect to a bidirectional tractor vehicle 12 such as the NEW HOLLAND NH TV140. Various other mounting brackets for mounting the loader unit 20 as can be appreciated.

The loader locking guide 30 and the loader mounting pocket 40 are attached to a side of the tractor frame 14 near and/or behind the larger rear wheel of the tractor vehicle 12. It can be appreciated that there is typically one set of mounting brackets on the right side of the tractor frame 14 and another set of mirrored mounting brackets on the left side of the tractor frame 14 even though the discussion herein focuses on only one set of mounting brackets.

Figure 5:
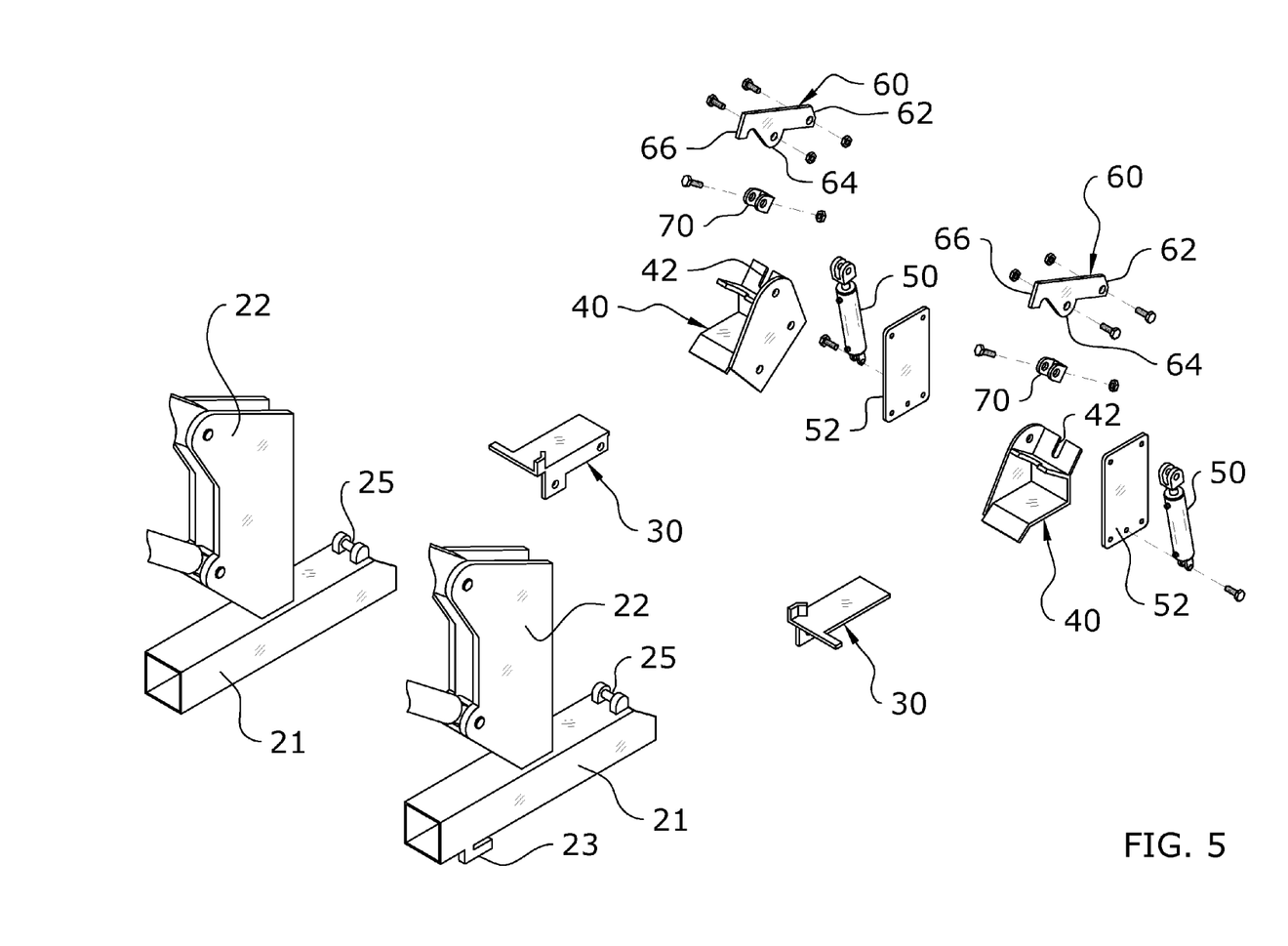
FIG. 5 is an exploded upper perspective view of the present invention.

FIGS. 1 through 3 further illustrate an exemplary loader unit 20 for supporting an implement 26 (e.g. bucket). The loader unit 20 has a pair of loader arms 24 pivotally connected to corresponding loader brackets 22. One or more hydraulic cylinders lift and lower the arms of the loader unit 20 as is well known with loader units 20 for tractor vehicles 12. The first bracket and the second bracket are each attached to a corresponding a loader frame 21 which may be comprised of an elongated member having a lower catch member 23 and a shaft attached to an upper portion of the loader frame 21. The shaft is raised above the upper surface of the loader frame 21 by a pair of corresponding end brackets as best illustrated in FIG. 5 of the drawings. Each shaft for both the left and right portions of the loader unit 20 extends transverse with respect to a longitudinal axis for each corresponding loader frame 21. The lower catch member 23 includes a horizontal slot that faces the mounting brackets on the tractor that catchably engages the loader loading guide when fully positioned upon the tractor frame 14 as illustrated in FIGS. 2 and 6c of the drawings. When the loader unit 20 is fully positioned upon the tractor vehicle 12, an inner end of the loader frame 21 is positioned within a pocket of the loader mounting pocket 40 as further illustrated in FIGS. 2 and 6c of the drawings. The pocket of the loader mounting pocket 40 is formed to a shape of the inner end of the loader frame 21 such as C-shaped, U-shaped or V-shaped with the opening facing rearwardly towards the loader unit 20.

The present invention is preferably attached to the mounting bracket comprised of the loader mounting pocket 40. The loader mounting pocket 40 includes an upper slot 42 within an upper forwardly angled member as illustrated in FIGS. 5 and 6c of the drawings. The upper forwardly angled member extends upwardly and away from the pocket of the loader mounting pocket 40. The loader locking guide 30 and the loader mounting pocket 40 are conventional mounting brackets for tractor vehicles 12 commonly utilized for the NEW HOLLAND NH TV140 bidirectional tractor vehicle 12.

D. Pivot Bracket.

Figure 6A:
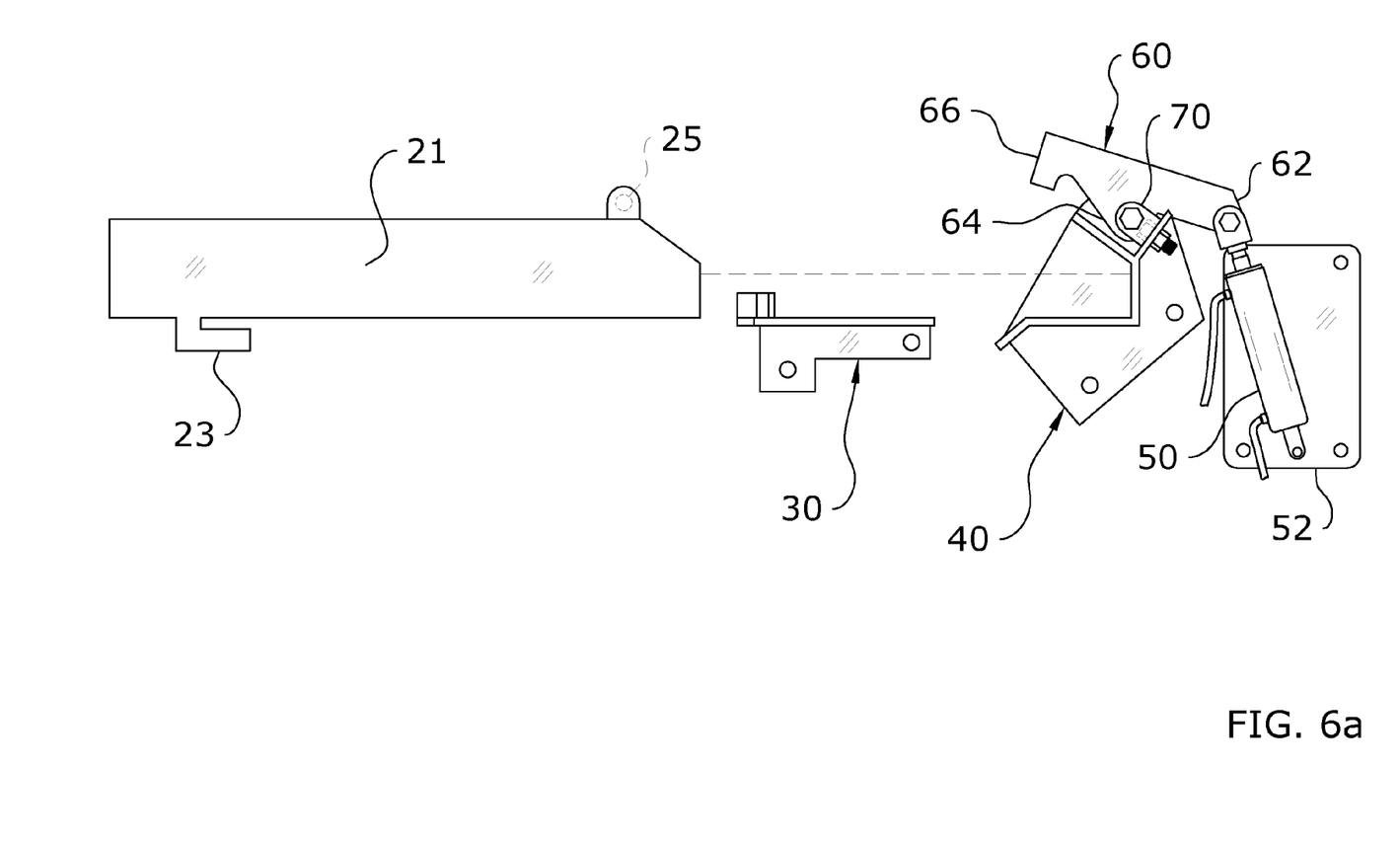
FIG. 6a is a side view of the loader frame removed from the mounting structure.
Figure 6B:
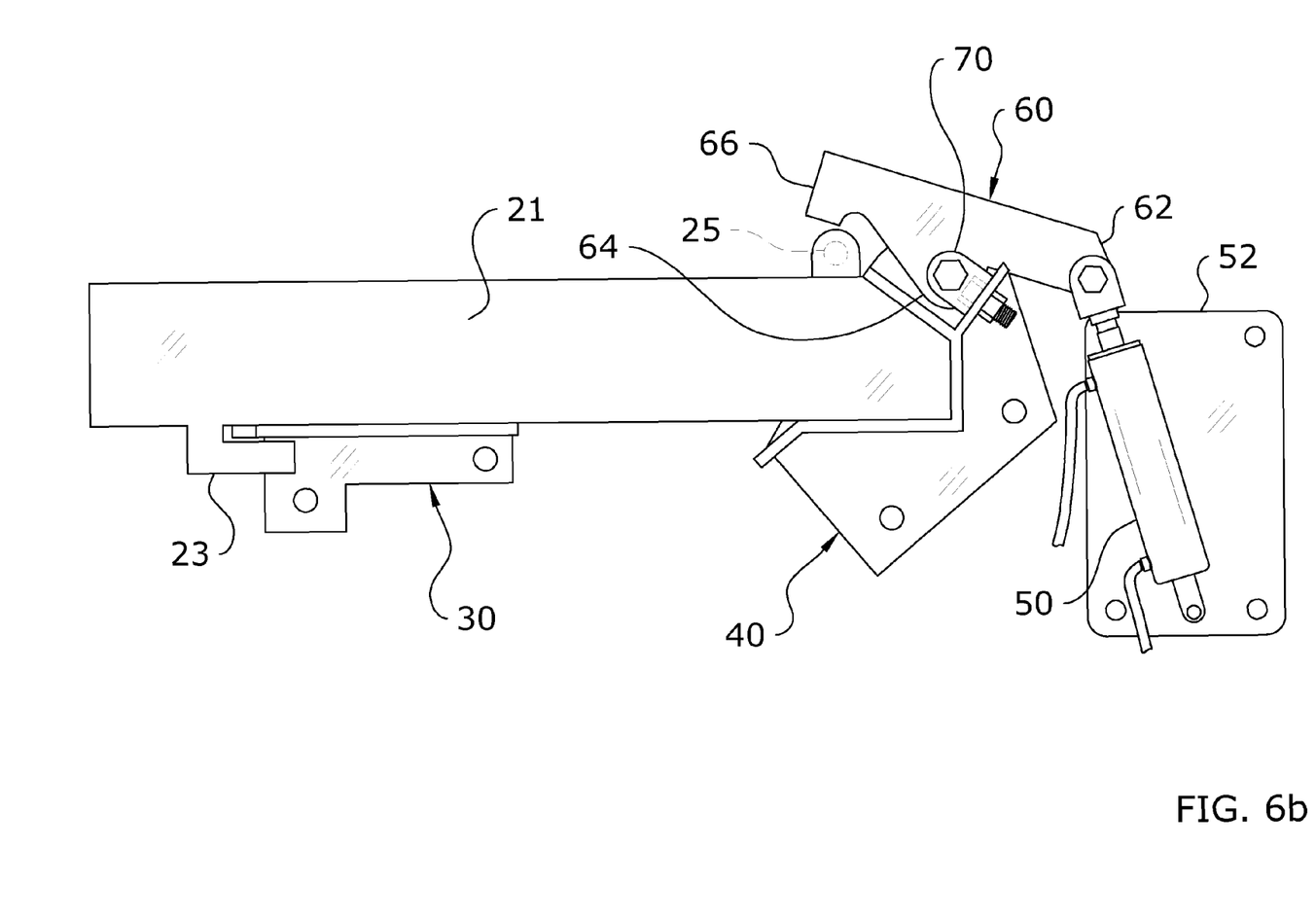
FIG. 6b is a side view of the loader frame positioned upon the loader locking guide and within the loader mounting pocket with the engaging member in the release position.
Figure 6C:
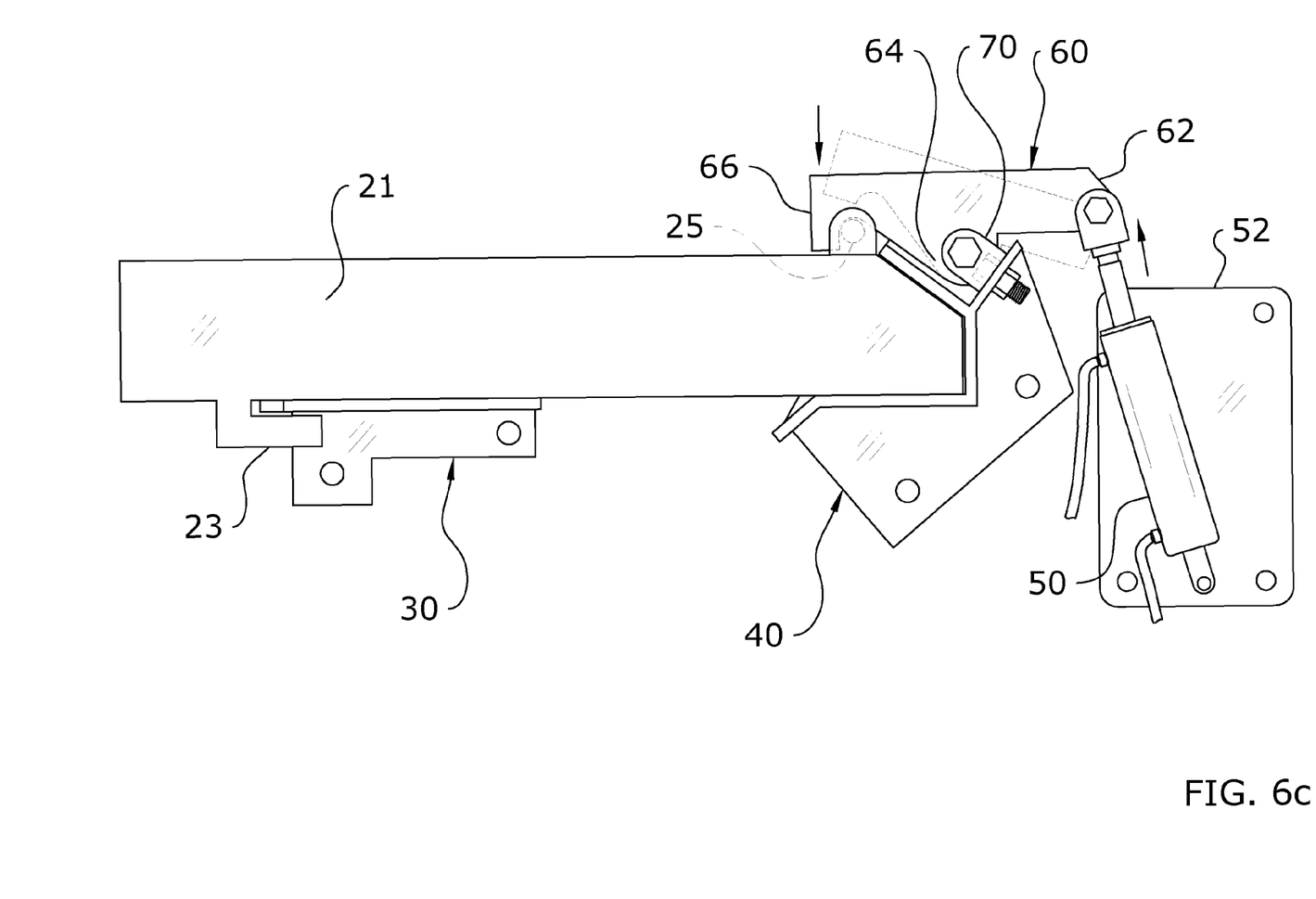
FIG. 6c is a side view of the loader frame positioned upon the loader locking guide and within the loader mounting pocket with the engaging member in the catch position to prevent removal of the loader frame.
Figure 7:
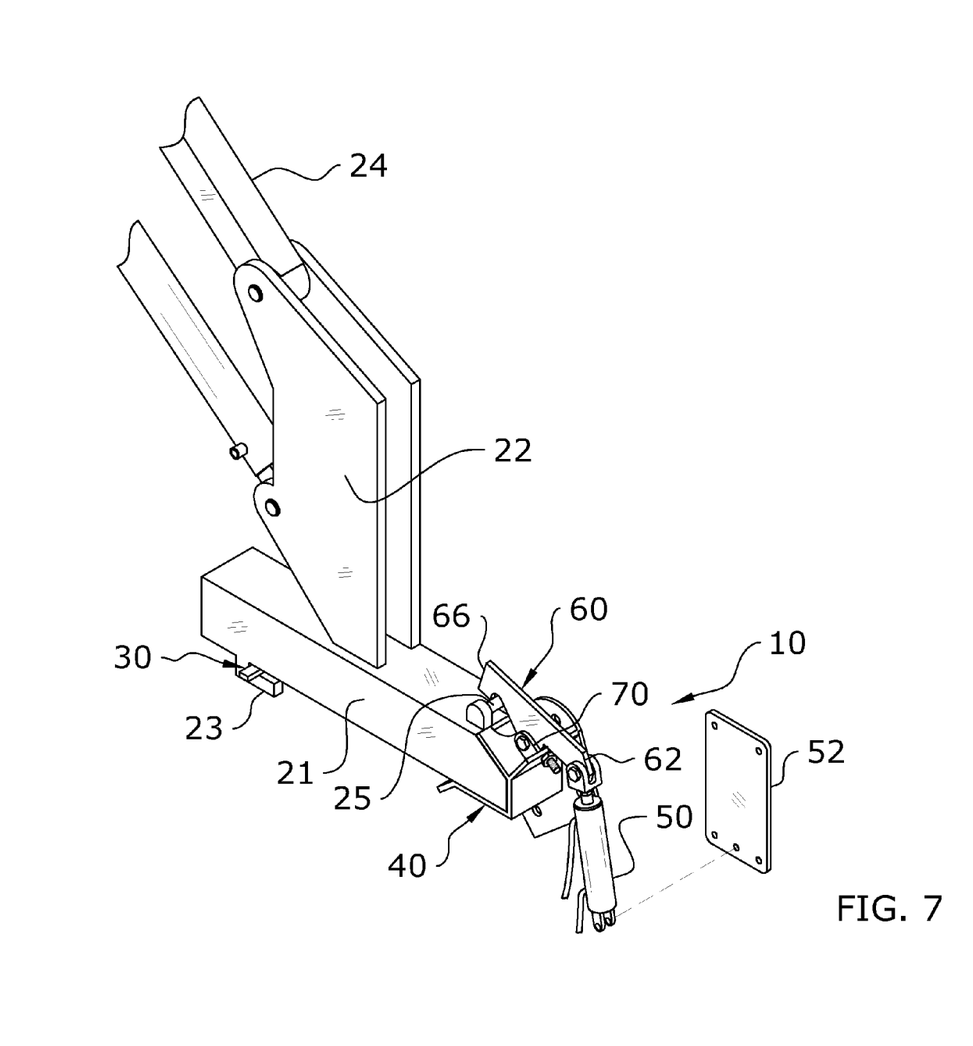
FIG. 7 is an upper perspective view of the engaging member in the catch position upon the shaft of the loader frame.
Figure 8:
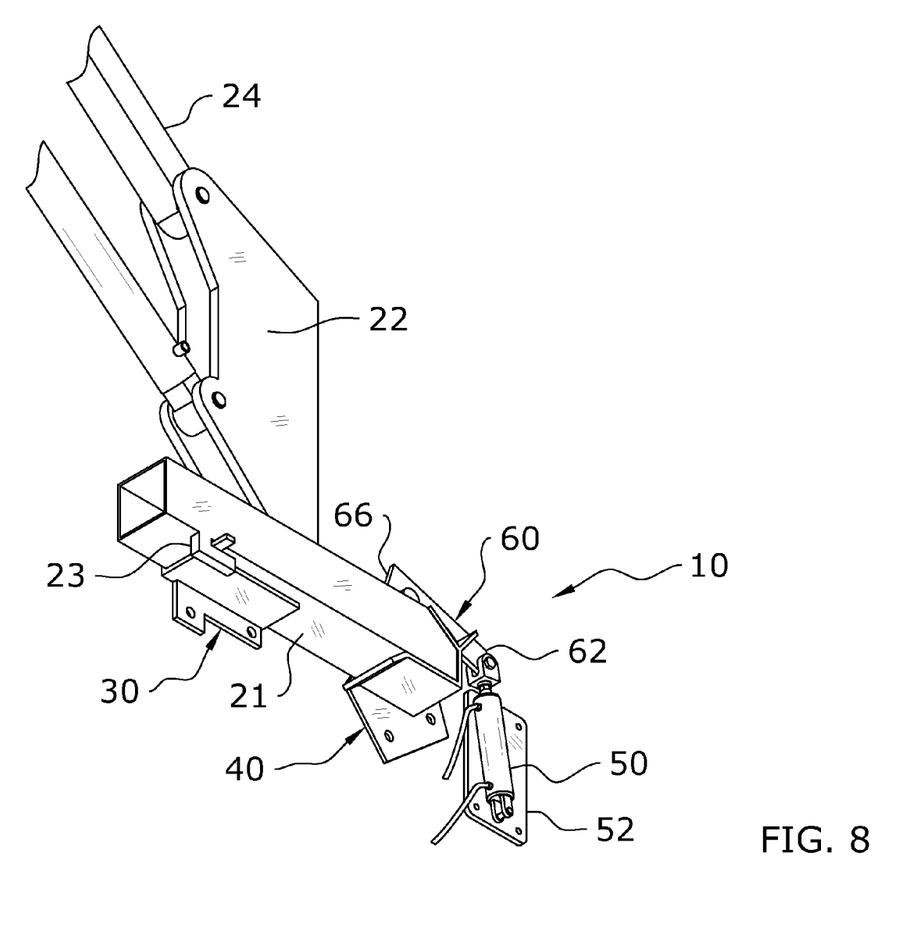
FIG. 8 is a lower perspective view of the engaging member in the catch position.

The pivot bracket 70 is attached to the loader mounting pocket 40 as illustrated in FIGS. 6a through 7 of the drawings. The pivot bracket 70 is important for the present invention since it allows the present invention to be attached to a conventional mounting bracket for the loader unit 20.

The pivot bracket 70 is preferably removably attached to the upper forwardly angled member of the loader mounting bracket with a fastener (e.g. bolt) extending through a hole in the base of the pivot bracket 70 and the upper slot 42 of the loader mounting bracket. The fastener is comprised of a threaded fastener and a threaded nut attached to the distal end portion of the threaded fastener as illustrated in FIGS. 6a through 7 of the drawings.

The pivot bracket 70 is preferably comprised of a U-shaped structure defining a slot between two side portions that extend parallel to one another from a base wherein the base is adjacent to the rear face of the upper forwardly angled member of the loader mounting pocket 40. The two side portions of the pivot bracket 70 further include apertures that receive a pin that extends through a corresponding aperture within the pivot portion 64 of the engaging member 60 so that the pivot bracket 70 may pivotally support the engaging member 60, wherein the engaging member 60 pivotally extends within the slot of the pivot bracket 70. The pivot bracket 70 is attached in a non-movable manner to the loader mounting pocket 40 such as via the fastener as discussed or by welding directly to the loader mounting pocket 40.

E. Engaging Member.

FIGS. 2 through 8 of the drawings illustrate the engaging member 60 used to selectively engage the corresponding upper shaft 25 of the loader frame 21. The engaging member 60 has a first end 62, a second end and a pivot portion 64 between the first end 62 and the second end.

As discussed previously, the engaging member 60 is pivotally connected to the pivot bracket 70 via the pivot portion 64. The engaging member 60 preferably pivots along a vertical plane with the opposing ends of the engaging member 60 being moved upwardly and downwardly respectively. The engaging member 60 is preferably comprised of a flat structure with the opposing ends positioned above the pivot portion 64 of the engaging member 60. The pivot portion 64 of the engaging member 60 preferably extends downwardly from the engaging member 60 to pivotally extend into the slot of the pivot bracket 70, wherein an aperture within the pivot portion 64 receives a pin or fastener that extends through the pivot bracket 70 and the pivot portion 64.

The second end of the engaging member 60 is preferably comprised of a hooked end 66 as illustrated in FIGS. 3 through 7 of the drawings. The hooked end 66 selectively engages and releases the corresponding upper shaft 25 of the loader frame 21. The hooked end 66 includes a cutout facing downwardly that selectively receives the upper shaft 25 of the loader frame 21 as best illustrated in FIGS. 6a through 6c of the drawings. The cutout preferably is angled upwardly from near the pivot portion 64 with the upper portion of the cutout being round similar to the upper shaft 25 cross sectional shape and with the distal end portion of the cutout extending at a downward angle in a substantially straight manner as illustrated in FIG. 6a of the drawings. The straight portion of the cutout of the hooked end 66 allows the engaging member 60 to be moved relative to the upper shaft 25 without interference.

F. Actuator.

An actuator 50 is attached to the first end 62 of the engaging member 60 and to the tractor frame 14 as illustrated in FIGS. 2 and 3 of the drawings. Each actuator 50 is attached to an existing hole within the tractor frame 14 preferably below and forwardly of the loader mounting pocket 40. A connection plate 52 is preferably attached to the tractor frame 14 with conventional fasteners and the actuator 50 is pivotally connected to the connection plate 52 (alternatively, the actuator 50 may be directly connected to the tractor frame 14 without a connection plate 52).

A first movement (e.g. downward) of the actuator 50 pivots the engaging member 60 into a release position as illustrated in FIG. 6a and a second movement (e.g. upward) of the actuator 50 pivots the engaging member 60 into a catch position as illustrated in FIG. 6c. The first movement is opposite of the second movement. When the engaging member 60 is in the catch position the second end of the engaging member 60 engages the shaft attached to the loader frame 21 to prevent the loader frame 21 from being removed from the loader mounting pocket 40 as further illustrated in FIGS. 2, 6c and 7 of the drawings. When the engaging member 60 is in the release position the second end does not engage the shaft thereby allowing the loader frame 21 to be removed from the loader mounting pocket 40 as illustrated in FIG. 6a of the drawings.

Figure 9:
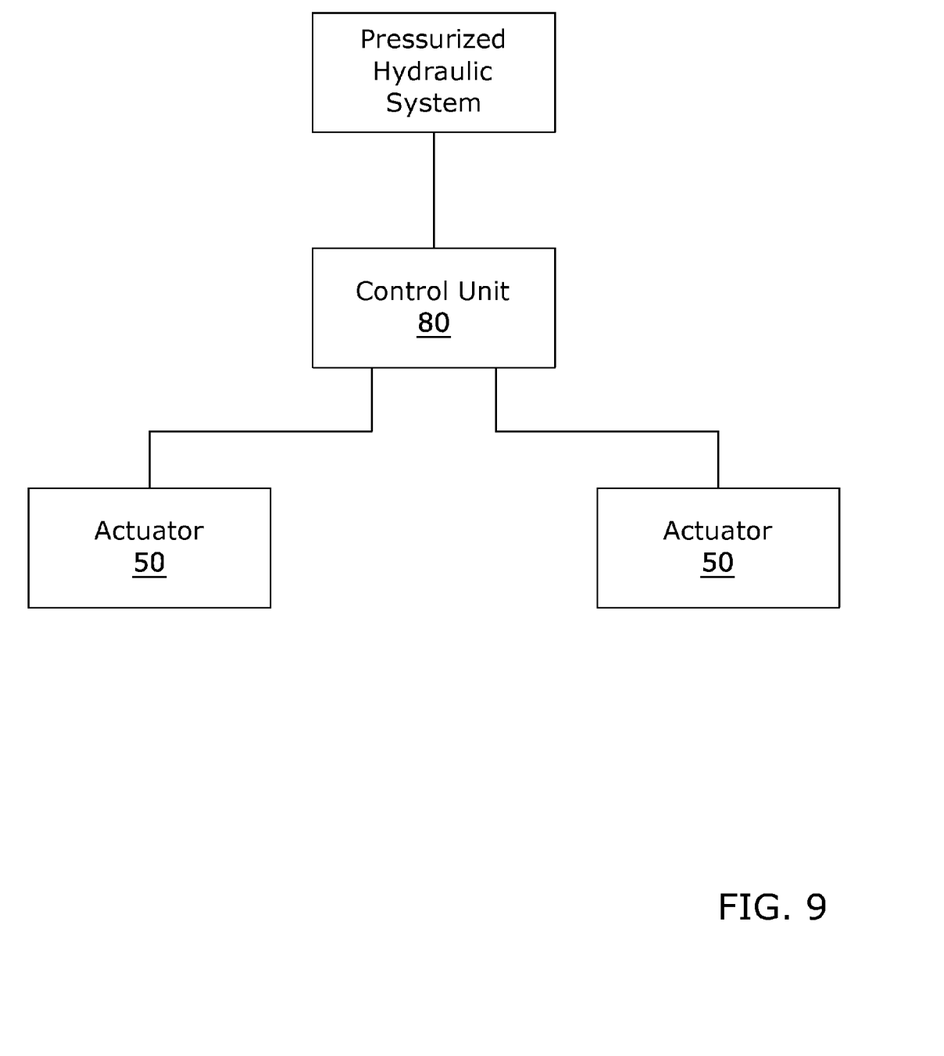
FIG. 9 is a block diagram illustrating the pressurized hydraulic fluid system for controlling the actuators.

The actuator 50 is preferably comprised of a linear actuator 50 that extends and retracts in a substantially vertical manner. The actuator 50 may be comprised of an electro-mechanical device, however, the actuator 50 is preferably comprised of a hydraulic cylinder to allow for usage of the pressurized hydraulic system of the tractor vehicle 12 to move the actuator 50. A control unit 80 is in communication with the actuator 50 to control movement of the actuator 50. The control unit 80 is preferably comprised of a valve unit fluidly connected to a pressurized hydraulic system of the tractor vehicle 12. One or more valve handles for the control unit 80 are positioned within the cab of the tractor vehicle 12 to allow the operator of the tractor vehicle 12 to actuate the actuators 50 as desired to catch or release the loader unit 20. The valve unit is fluidly connected between the actuator 50 and the pressurized hydraulic system of the tractor vehicle 12 as illustrated in FIG. 9 of the drawings.

While the discussion above discusses one set of the present invention, it can be appreciated by the drawings and prior discussion that two sets of the present invention are preferably utilized to secure a left side and a right side of the loader unit 20. Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A tractor loader attachment system, comprising:
    a pivot bracket attached to a first mounting bracket, wherein said first mounting bracket is attached to a tractor frame of a tractor vehicle;
    an engaging member having a first end, a second end and a pivot portion between said first end and said second end, wherein said engaging member is pivotally connected to said pivot bracket via said pivot portion; and
    an actuator attached to said first end of said engaging member and to said tractor frame, wherein movement of said actuator pivots said engaging member into a release position or a catch position, wherein when said engaging member is in said catch position said second end engages an upper shaft disposed on top of a loader frame to prevent said loader frame from being removed from said first mounting bracket and wherein when said engaging member is in said release position said second end does not engage said shaft thereby allowing said loader frame to be removed from said first mounting bracket;
    including a control unit in communication with said actuator to control movement of said actuator, wherein said control unit is comprised of a valve unit fluidly connected to a pressurized hydraulic system of said tractor vehicle, wherein said valve unit is fluidly connected to said actuator, and wherein said actuator is comprised of a hydraulic cylinder.

2. The tractor loader attachment system of claim 1, wherein said first mounting bracket is comprised of a loader mounting pocket.

3. The tractor loader attachment system of claim 2, wherein said loader mounting pocket includes an upper slot, wherein said pivot bracket is attached to said loader mounting bracket with a fastener extending through said pivot bracket and said upper slot.

4. The tractor loader attachment system of claim 3, wherein said fastener is comprised of a threaded fastener and a threaded nut.

5. The tractor loader attachment system of claim 1, wherein said second end is comprised of a hooked end.

6. The tractor loader attachment system of claim 5, wherein said hooked end includes a cutout facing downwardly.

7. The tractor loader attachment system of claim 1, wherein said pivot bracket is comprised of a U-shaped structure defining a slot, wherein said engaging member pivotally extends within said slot.

8. The tractor loader attachment system of claim 1, wherein said actuator is comprised of a linear actuator.

9. A tractor loader attachment system, comprising:
    a tractor vehicle having a tractor frame;
    a loader locking guide attached to said tractor frame;
    a loader mounting pocket attached to said tractor frame;
    a loader unit having a loader frame and a shaft attached to an upper portion of said loader frame, wherein said loader frame includes a lower catch member to catchably engage said loader loading guide and wherein an inner end of said loader frame is positioned within a pocket of said loader mounting pocket;
    a pivot bracket attached to said loader mounting pocket;
    an engaging member having a first end, a second end and a pivot portion between said first end and said second end, wherein said engaging member is pivotally connected to said pivot bracket via said pivot portion; and
    an actuator attached to said first end of said engaging member and to said tractor frame, wherein a first movement of said actuator pivots said engaging member into a release position and a second movement of said actuator pivots said engaging member into a catch position, wherein when said engaging member is in said catch position said second end engages said shaft disposed on top of said loader frame to prevent said loader frame from being removed from said loader mounting pocket and wherein when said engaging member is in said release position said second end does not engage said shaft thereby allowing said loader frame to be removed from said loader mounting pocket; including a control unit in communication with said actuator to control movement of said actuator, wherein said control unit is comprised of a valve unit fluidly connected to a pressurized hydraulic system of said tractor vehicle, wherein said valve unit is fluidly connected to said actuator, and wherein said actuator is comprised of a hydraulic cylinder.

10. The tractor loader attachment system of claim 9, wherein said pivot bracket is comprised of a U-shaped structure defining a slot, wherein said engaging member pivotally extends within said slot.

11. The tractor loader attachment system of claim 9, wherein said actuator is comprised of a linear actuator.

12. The tractor loader attachment system of claim 9, wherein said pocket of said loader mounting pocket is formed to a shape of said inner end of said loader frame.

13. The tractor loader attachment system of claim 9, wherein said loader mounting pocket includes an upper slot, wherein said pivot bracket is attached to said loader mounting bracket with a fastener extending through said pivot bracket and said upper slot.

14. The tractor loader attachment system of claim 13, wherein said fastener is comprised of a threaded fastener and a threaded nut.

15. The tractor loader attachment system of claim 9, wherein said second end is comprised of a hooked end.

16. The tractor loader attachment system of claim 15, wherein said hooked end includes a cutout facing downwardly.

* * * * *